Patented Nov. 8, 1932

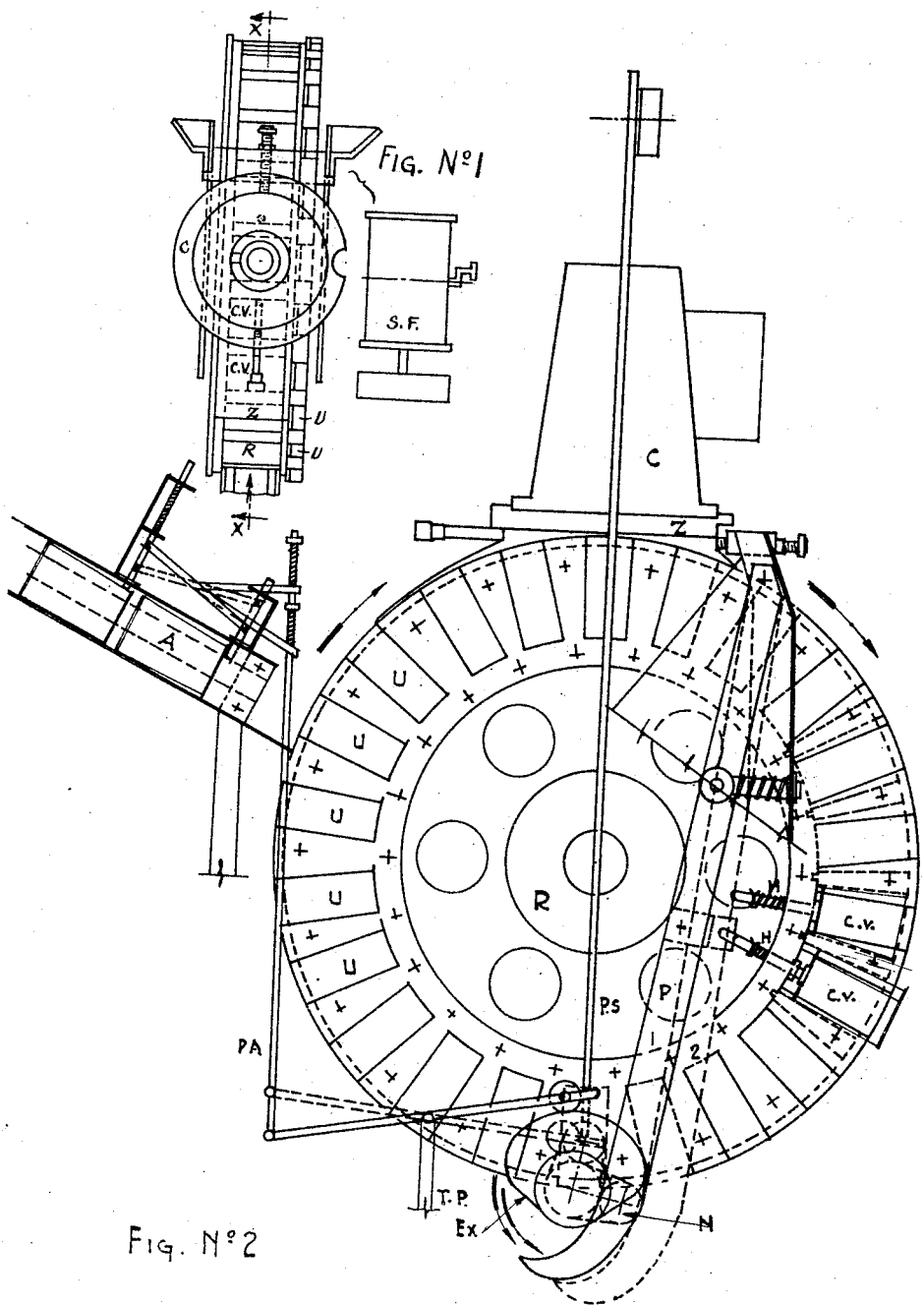

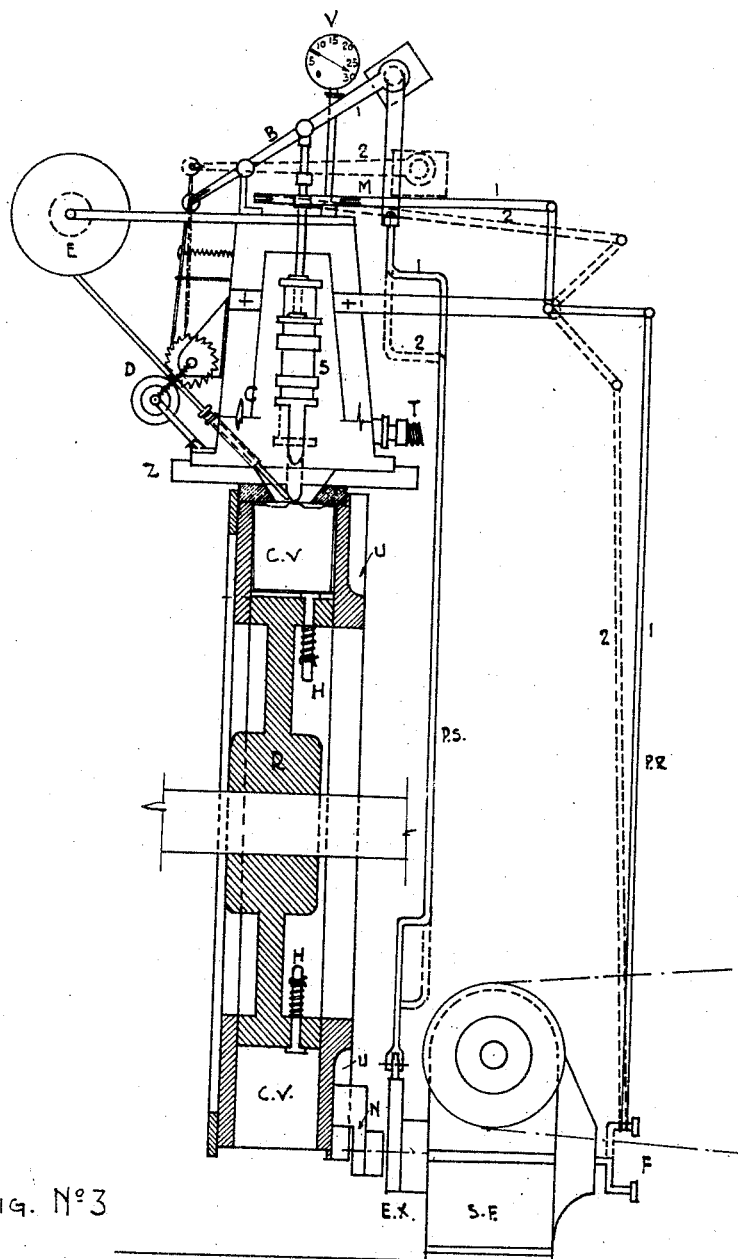
Fig. No 3

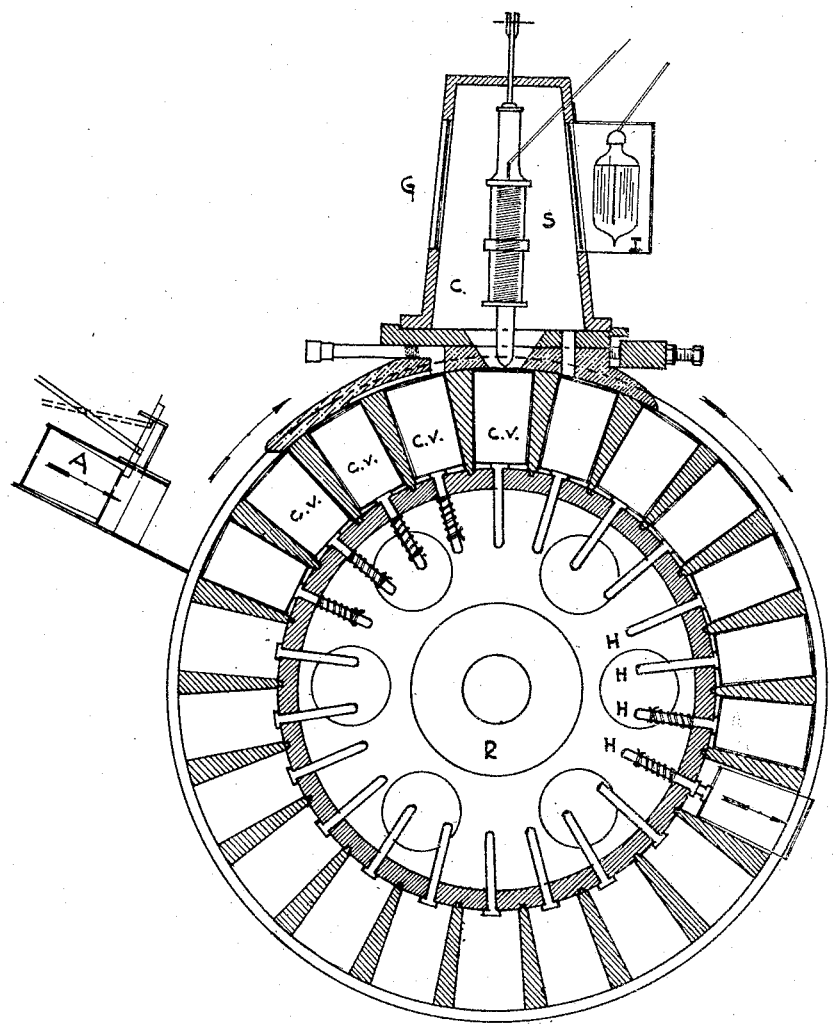
Fig. Nº 4

1,887,062

UNITED STATES PATENT OFFICE

SALVADOR MORASSO, OF SALADILLO, ROSARIO DE SANTA FE, ARGENTINA, ASSIGNOR TO COMPANIA SWIFT DE LA PLATA SOCIEDAD ANONIMA, OF BUENOS AIRES, ARGENTINA

VACUUM SOLDERING MACHINE

Application filed September 22, 1930, Serial No. 483,699, and in Argentina May 12, 1930.

This descriptive report refers to a new machine for soldering cans of food substances and other products, at the same time producing the vacuum necessary for the conservation of the substances packed.

As will be seen further on, the invention consists essentially of a disc drum or carrier which turns round with an intermittent movement on a horizontal axis, being provided with peripherally disposed radial sockets to convey the containers to be soldered and combined with a vacuum bell inside of which is a movable soldering device conveniently fed with solder and put in such motion as to permit it to effect the soldering along the closing line of the container.

This machine offers decided advantages over the different means utilized to date, both as regards speed and perfection of the soldering and the degree of vacuum in the containers.

In order to better understand this description, I attach detailed drawings showing with the same letters the same visible parts in the different views and in which:

Fig. No. 1 represents schematically and in plan view a machine for soldering and vacuumizing cans for conserved products, combined in accordance with my invention.

Fig. No. 2 is a front elevation of the same.

Fig. No. 3 shows the same machine in lateral elevation and part of a cross-section.

Fig. No. 4 is a sectional elevation along line XX of Fig. No. 1.

In the drawings, R is a cast drum having a series of radial sockets CV, and combined at the upper part with a vacuum bell C resting on a special brass shoe Z having an arcuate face, fitting into a groove made in the peripheral surface of the drum. Inside of the bell C is an electric soldering device S connected to a balance-beam B and to a lever M, which in turn are joined to levers PS and PR respectively. The bell is completed by a set of cog-wheels D, a spool E for the solder, a vacuum-gage V, two reinforced glass covers G, connection T for a vacuum-pump, and a box containing an electric lamp I. The drum R, on one lateral face, has as many notches U as sockets CV, and at the inner end of each socket CV there is a small spring seated ejector H operated by lever P.

The brass shoe Z is formed with an arcuate face having the same curvature as the peripheral surface of the drum R and rides in a groove formed in the peripheral surface of the drum. At or near the center of the shoe Z is formed a somewhat conical soldering chamber or cavity through which the soldering device S advances to contact with the can to be soldered. Solder is automatically fed from the spool E into the soldering chamber by means of the cogwheel D. The shoe Z is also provided with arcuate extensions on either side of the soldering chamber which hermetically close at least one socket on each side of the soldering chamber to assure a sufficient vacuum in the socket positioned directly under the soldering device.

The driving means is composed of an electric motor acting on a gear mechanism SF, which has a connecting-rod crank F, an eccentric EX, and a crank N.

A feeding device A, joined by balance beams to lever PA which receives alternative motion from the eccentric EX, completes the machine.

The operation is as follows: The gear mechanism SF, by means of the crank N upon entering notch U, drives drum R with an intermittent movement in the direction of the arrow, as in the mechanism known as "maltese cross".

In the space of time between each rotation of N, drum R stops a sufficient length of time to permit feeder A, actuated by eccentric EX, to feed one tin into the coincident socket CV.

The movement of drum R carries the tins successively towards the zone covered by shoe Z, where the vacuum is produced by an ordinary pump across tube T, the said tins in turn coming under soldering device S. This soldering device has two movements; one, up and down, obtained by lever PS actuated by eccentric EX; and the other, circular or gyratory, by means of crank F actuating levers PR and M. Numbers 1 and 2 indicate the extreme positions of levers PR and M.

The circular or gyratory motion of the soldering device S assures the termination of the soldering process in such a manner that the usual solder button or point is converted into a flattened spherical cap.

Lever PS is connected to the balance-beam B in such a way that, when it causes cogwheel D to turn, it permits the feeding of solder, held in the form of wire on the spool E, to the soldering device.

With these combinations uniform and perfect soldering is obtained, while at the same time the necessary vacuum is insured for keeping the product in a wholesome condition. Vacuum-gage V indicates the degree of vacuum obtained.

Once the tin has been soldered and passed out of the vacuum zone, a lever P, also actuated by N, pushes the small spring seated ejector H which forces the cans one by one out of the corresponding sockets CV of the drum R.

Having thus described and specified the nature of my invention and the method of putting it into practice, what I declare to claim as my own exclusive invention and as my assignee's property, is:

1. A vacuum soldering machine comprising a carrier having a plurality of spaced sockets adapted to receive cans, a shoe arranged to close several of said sockets hermetically, said shoe having a soldering chamber therein positioned to communicate with one of said sockets, a soldering device arranged to operate within said soldering chamber, means to exhaust said soldering chamber, means holding a supply of solder wire, means to feed said solder wire intermittently into said soldering chamber for coaction with said soldering device, and means to actuate said carrier intermittently to register said sockets successively with said soldering chamber.

2. A device of the class described, comprising an intermittently rotating drum having a plurality of peripherally disposed radial sockets adapted to receive cans, a shoe adjacent the drum and arranged to close certain of said sockets hermetically, a vacuum bell carried by said shoe and having communication through said shoe to one of said sockets, a soldering device disposed within said vacuum bell, a vacuum pump connection on said bell to effect exhaustion of the space within said bell, automatic means to introduce cans into said sockets successively, an ejector arranged in each of said sockets, and automatic means for actuating said ejector to eject the cans from said sockets after the soldering operation.

3. A device of the class described, comprising an intermittently rotating drum having a plurality of peripherally disposed radial sockets adapted to receive cans, an arcuate shoe adjacent said drum and arranged to close a segmental group of said sockets hermetically, said shoe having a soldering cavity therein positioned to communicate with one of said sockets, a vacuum bell carried by said shoe and communicating with said soldering cavity, means to exhaust said vacuum bell, a soldering device disposed within said vacuum bell, means holding a supply of solder wire, means to feed said solder wire automatically into said soldering cavity for coaction with said soldering device, and means to actuate said soldering device and said solder-feeding means intermittently and simultaneously.

4. A device of the class described, comprising an intermittently rotating drum journaled on a horizontal axis and having a plurality of peripherally disposed radial sockets adapted to receive cans, a shoe adjacent said drum and arranged to close several of said sockets hermetically, said shoe having a soldering cavity therein positioned to communicate with one of said sockets, arcuate extensions on said shoe overlying a socket on each side of said cavity, a vacuum bell carried by said shoe and positioned adjacent said soldering cavity, means to exhaust said vacuum bell, a soldering device disposed within said bell, automatic means to advance and gyrate said soldering device intermittently and simultaneously, within said soldering cavity, and automatic means to feed solder into said soldering cavity for coaction with said soldering device.

5. A device of the class described, comprising an intermittently rotating drum having a plurality of peripheral sockets adapted to receive cans, a shoe arranged to close certain of said sockets hermetically, said shoe having a soldering chamber therein positioned to communicate with one of said sockets, a soldering device arranged to operate within said chamber, means to introduce cans into said sockets successively, a spring-seated ejector arranged at the bottom of each of said sockets, and means to actuate said ejectors intermittently and successively after the soldering operation.

6. A device of the class described, comprising an intermittently rotating drum having a plurality of peripheral sockets adapted to receive cans, a shoe arranged to close certain of said sockets hermetically, said shoe having a soldering chamber therein positioned to communicate with one of said sockets, a soldering device arranged to operate within said chamber, means supporting a coil of solder wire, means affording entrance of said solder wire into said soldering chamber and arranged to prevent influx of air therewith, means to feed said solder wire into said soldering chamber, and automatic means to actuate said soldering device and said solder feeding means simultaneously and intermittently in synchronized relation with the rotation of said drum.

SALVADOR MORASSO.